United States Patent [19]

Updegraff

[11] 3,922,025

[45] Nov. 25, 1975

[54] METHOD AND APPARATUS FOR APPLYING AND REMOVING CONTACT LENSES

[76] Inventor: Edward R. Updegraff, 2131 Florida Ave., NW. Apt. 1, Washington, D.C. 20008

[22] Filed: July 17, 1970

[21] Appl. No.: 55,663

[52] U.S. Cl............................. 294/1 CA; 294/64 R
[51] Int. Cl.² ........................................... A61F 9/00
[58] Field of Search ... 294/1 CA, 64 R, 64 A, 64 B; 279/3; 248/363; 128/303; 351/160

[56] References Cited
UNITED STATES PATENTS
3,304,113   2/1967   Hutchison ............................ 294/64

FOREIGN PATENTS OR APPLICATIONS
112,254   12/1965   Netherlands ......................... 294/64

OTHER PUBLICATIONS
IBM Technical Disclosure Bulletin, Vol. 9, No. 7, Dec. 1966, pg. 950.

Primary Examiner—Evon C. Blunk
Assistant Examiner—Johnny D. Cherry

[57] ABSTRACT

An apparatus and method for applying and removing contact lenses from the eyes by employing an elongated, flexible tube member having a cone-shaped suction cup on one end for contact with the lens. Vacuum is applied to the cup to releasably hold a lens by placing the other end of the tube in the mouth and lightly sucking on the tube. The vacuum necessary to hold the lens may be retained in the tube for substantial periods by placing the tongue over the end of the flexible tube in the mouth.

1 Claim, 2 Drawing Figures

U.S. Patent  Nov. 25, 1975  3,922,025
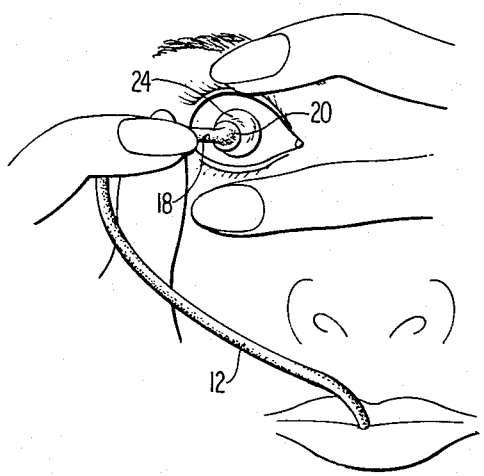
FIG. 1
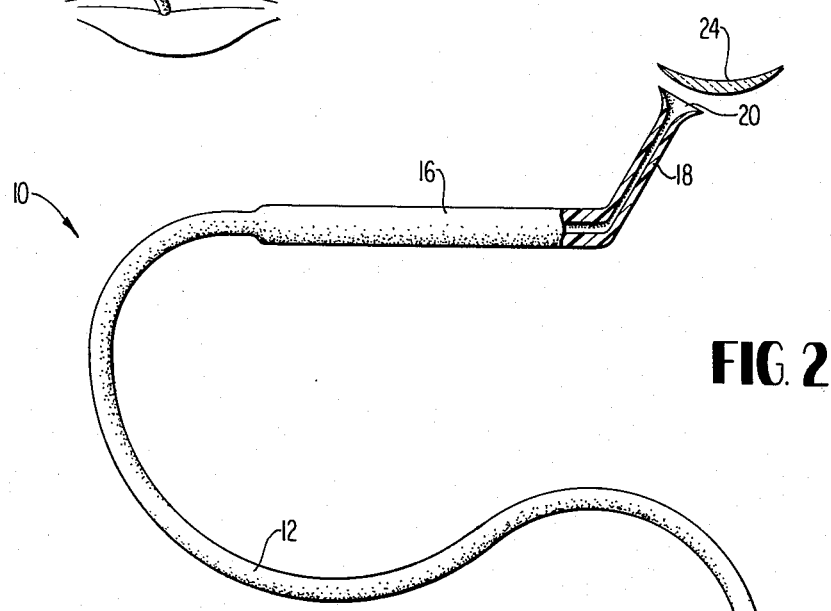
FIG. 2
FIG. 3
PRIOR ART
INVENTOR
EDWARD R. UPDEGRAFF
BY Beveridge & De Grandi
ATTORNEYS

METHOD AND APPARATUS FOR APPLYING AND REMOVING CONTACT LENSES

BACKGROUND OF THE INVENTION

1. Field of the Invention

This invention relates to an apparatus and method for use in placing a contact lens on the eye, and for removing a contact lens from the eye. More specifically, the invention relates to such a method and apparatus employing a small resilient suction cup to hold a lens for manipulation during placing the lens on or removing the lens from an eye, with means being provided for the user to apply the necessary suction by mouth.

2. Description of the Prior Art

Although numerous devices have been developed to assist in removing a contact lens from the eye, the prevailing method is to "wink" it out. For the beginner, this method usually involves spreading a cloth such as a handkerchief or the like on a horizontal surface with a mirror placed on the cloth. The lens wearer then leans over the cloth close to the mirror, holds the eyelids apart with the fingers of one hand, and "winks" the eyelids until the lens flies from its position to land, hopefully, on the mirror or cloth. With practice, this technique may be mastered by most contact lens wearers so that the mirror becomes unnecessary, and many become so expert that they can "wink" the lens into their open hand without difficulty. However, the technique is never mastered by some, making it necessary for them to employ other techniques and devices to remove their contact lenses.

The prevailing method employed in placing a contact lens on the eye is for the user to wet the end of one finger, usually the index finger, with an appropriate fluid and place the lens on the wet finger which is then moved toward the eye to carry the lens into contact therewith. Simultaneously, the other hand is usually employed to hold the eyelids, making the manipulation of the lens in the vicinity of the eye a very clumsy operation. This method is neither easy or accurate, and presents serious danger of damaging the cornea since the eye cannot focus on the lens or the finger as the finger is brought close to the eye. Thus, the final step of actually placing the lens on the cornea in the proper position is guesswork to a substantial degree.

One method employed to remove contact lenses by wearers who cannot master the "winking" technique, discussed above, involves use of a small rubber suction cup and syringe, usually in the form of a relatively short, straight section of flexible rubber tubing closed at one end and having its open end flared out to form a slightly cone-shape suction cup having a diameter slightly smaller than the diameter of the contact lens. Again using the cloth and mirror, and holding the eyelids wide with the fingers of one hand, the wearer places the cup firmly against the lens while squeezing the tube tightly with the thumb and index finger of the other hand. When the cup is properly positioned on the lens, the finger pressure on the tube is relaxed, creating a suction at the cup and the lens is adhered thereto. The lens is then removed from the cornea by gently pulling it off with the tube.

Another method of removing a contact lens involves the use of a suction cup device without the aid of a separate means for applying suction, or vacuum, to the cup. This device employs the adhesion between the cup and the lens, aided by wetting the cup before applying it to the lens, in combination with the suction created by pressing the resilient cup into contact with the lens. This "adhesion cup" device is applied to the lens in essentially the same manner as the syringe-actuated device described above.

The winking method described above always presents the hazard of the lens striking the mirror or the cloth and rolling therefrom where it is difficult to find, particularly if the wearer needs the lens in proper position on the eye for good vision. Even the experts sometimes miss the open hand target.

While the suction cup and adhesion cup methods provide more positive control of the lens after the suction cup is attached, the use of a mirror is always necessary to enable the wearer to try to see the cup and the eye for proper positioning of the cup on the lens. Two difficulties are always present because: (1) the fingers holding the rubber tube and applying the necessary pressure obstruct the wearer's vision of the lens and the suction cup in the mirror; and (2) the suction cup, itself, in many of these prior art devices is almost as large as the contact lens so that, as the lens approaches the eye, the suction cup blocks vision of the mirror, again making the final movement into contact with the cornea a blind operation. In trying to master this method, it is not uncommon for the lens to be dislodged from the proper position and slide under an eyelid. It must then be carefully worked back into proper position before again attempting the removal procedure.

Another problem encountered with operation of the known syringe-actuated suction cup is that its successful use requires carefully coordinated movement. For wearers suffering from arthritis in the hand or for any reason lacking the required manual dexterity of the fingers, applying the necessary finger pressure, and releasing it at the proper time, can be a real problem.

SUMMARY OF THE INVENTION

The foregoing and other defects of the prior art are overcome in accordance with the present invention in which suction is applied by the mouth through a flexible tube to a suction cup to remove contact lenses from the eyes. In a preferred embodiment of the invention, the apparatus consists of a length of small, very flexible hollow tubing terminating at one end in a substantially rigid mouthpiece which is held inside the teeth. A relatively rigid hollow base section is integrally formed on or connected to the other end of the elongated flexible tube, and a short flexible neck having a suction cup on one end thereof is attached to the other end of the base section and projects therefrom at an acute angle relative to the longitudinal axis of the base section. Preferably the diameter of the suction cup is slightly less than one half the diameter of a contact lens.

To remove a contact lens from the eye, the device described above is held between the thumb and index finger at the base section, and the end of the flexible tube is placed in the mouth with the mouthpiece being held between the teeth. Looking into a mirror, the wearer holds the eyelids open with the fingers of the other hand, and carefully positions the suction cup on the contact lens. Since the diameter of the suction cup is slightly less than half the diameter of the contact lens, the wearer can still see the mirror to enable the suction cup to be gently positioned adjacent the edge of the lens without touching the iris with the suction cup. The angle between the base and neck permits the base and the fingers holding it to be out of the line of sight.

With the suction cup so positioned, the wearer draws the air from the device by sucking on the end of the flexible tube in the same manner as when drawing on a drinking straw, then seals the mouthpiece with the tongue. The lens is now firmly held to the cup by air pressure, and is gently lifted from the eye with the thumb and finger holding the base section. Still holding the flexible section between the teeth and with the tongue sealing the end, the wearer now has both hands free to put on glasses, if needed, and then take the lens from the cup after the suction is released by removing the tongue from the mouthpiece.

BRIEF DESCRIPTION OF THE DRAWINGS

The advantages of the present invention will become apparent from the detailed description thereof taken in conjunction with the drawings in which:

FIG. 1 is a view illustrating the method of the present invention;

FIG. 2 is a plan view, partly in section, of the apparatus according to the present invention; and FIG. 3 is a view illustrating one prior art method of removing a contact lens.

DESCRIPTION OF A PREFERRED EMBODIMENT

Referring now to the drawings in detail, the apparatus of the invention is illustrated in FIG. 2 and indicated generally by the reference numeral 10. The device consists of an elongated, flexible tube 12 having one open end releasably attached to a relatively rigid mouthpiece 14. Tube 12 has a body portion 16 spaced from its other end. Body 16 is preferably of substantially larger diameter than the flexible tube 12 and is therefore substantially less flexible to provide a convenient finger hold for gripping and manipulating the device. Integrally formed on the end of the body 16 is a relatively short flexible neck portion 18 terminating at its open end in an outwardly flared, flexible suction cup 20.

As clearly illustrated in FIG. 2, the neck portion 18 is disposed at an acute angle with respect to the longitudinal axis of body portion 16. This facilitates use of the device by moving the relatively rigid base section 16 and the fingers holding the base 16 out of the line of sight and positioning the suction cup 20 to contact the lens at one side edge thereof. Suction cup 20 is preferably tapered so that the side edges thereof are very thin, and therefore very flexible to assure good, firm holding contact with the smooth glass surface when suction is applied to the cup through the tube.

Mouthpiece 14 is illustrated as having an enlarged outwardly turned rim 22 formed on its open end. This enlarged rim 22 both facilitates sealing the end of the tube with the tongue, and assures against the tube being inadvertently dropped or pushed from between the teeth.

While the body 16, neck 18 and suction cup 20 is illustrated in FIG. 2 as being integrally formed with the flexible tube 12, it is understood that these elements could readily be formed separately and attached to one another in the same manner as that employed to attach mouthpiece 14 to the open end of tube 12. For example, body 16 could readily be molded from a relatively rigid plastic material, with one of its opposed ends being attached to the tube 12 and the other to the flexible neck 18. It is also understood that the mouthpiece 14 could be eliminated entirely, or alternatively, could be integrally formed on the end of the tube 12 by providing a rolled or molded rim directly on the open end of the tube.

Referring now to FIG. 1, the apparatus of FIG. 2 is illustrated in use to remove a contact lens 24 from the eye of a wearer. This is accomplished by placing the open end of the tube 12 into the mouth, gripping the mouthpiece 14 lightly between the teeth, and by gripping the body portion 16 between the thumb and index finger of one hand. Looking directly into a mirror, the suction cup is carefully positioned adjacent one side of the lens 24, thereby leaving a major portion of the iris uncovered to permit continuous viewing through the mirror as the suction cup is positioned. Holding the suction cup 20 in contact with the lens 24 by very light pressure on the body 16, suction is then applied to the end of the tube 12 to firmly attach the suction cup 20 to the lens 24. The tongue is then placed over the end of the mouthpiece 14 to seal the partial vacuum in the hollow tube, and the body portion 16 is then manipulated by the fingers to gently lift the lens 24 from the cornea.

If the wearer has adequate vision, the lens may then immediately be removed from the suction cup 20 and deposited into its appropriate container. Alternatively, since the lens is firmly retained by the suction cup, the body 16 may be released and permitted to hang loosely from the mouth, leaving both hands free for the wearer to put on glasses to enable him to see to properly store the removed lens.

The apparatus of the present invention is equally useful for positioning a contact lens onto the cornea. This is accomplished by placing the suction cup 20 into contact with the contact lens 24 adjacent one peripheral edge thereof and applying sufficient suction to the tube 12 to retain the lens. This can be accomplished while still wearing glasses, if necessary, with the lens being firmly held in position on the suction cup by the partial vacuum sealed in the tube by the tongue leaving both hands free to dispose of the glasses and prepare for installing the contact lens in the eye. Again looking directly into a mirror, the lens is carefully placed on the cornea and released in position by simply removing the tongue from the end of mouthpiece 14.

The device may also be employed to place a lens on the eye, without use of suction applied with the mouth. To accomplish this, the flexible tube and mouthpiece is permitted to hang free as the base is held in the fingers. The convex side of the lens is wet with a drop of conventional wetting solution, and the suction cup is placed on the lens adjacent one side edge thereof. The adhesion qualities of the wetting solution will hold the lens on the cup so that the lens may be picked up, turned over and held until a drop of solution can be placed in the concave side of the lens. Leaning over a mirror, and holding the eyelids open with the other hand, the lens can be seen to permit proper positioning on the eye. The cup can then easily be removed as there is no suction holding the lens. Preferably, the eyelids are permitted to close slowly over the edges of the lens before removing the cup to retain the lens against inadvertent dislodgment.

While I have disclosed and described the preferred embodiment of my invention, I wish it understood that I do not intend to be restricted solely thereto, but that I do intend to include all embodiments thereof which would be apparent to one skilled in the art and which come within the spirit and scope of my invention.

I claim:

1. The method of removing a contact lens from an eye comprising the steps of placing in the mouth one end of an elongated flexible tube having mounted on its other end a suction cup element having a diameter no greater than about half the diameter of the contact lens to be removed, looking into a mirror through the lens to be removed and simultaneously placing the suction cup into contact with one side portion only of the lens to thereby permit continuous viewing of the mirror through the lens past said suction cup to provide unobstructed observation of the operation by the eye from which the lens is to be removed, applying a suction through the flexible tube to the suction cup to releasably secure the lens to the suction cup, and manually removing the lens from the eye while maintaining the suction in the tube and suction cup by applying a lifting pressure to said one side of the lens.

* * * * *